(12) United States Patent
Malik et al.

(10) Patent No.: US 6,387,486 B1
(45) Date of Patent: May 14, 2002

(54) PRESSURE SENSITIVE ADHESIVE TAPE AND SILICONE-FREE RELEASE COATING USED THEREIN

(75) Inventors: Ranjit Malik, York; Julie Clonan, Steelton, both of PA (US)

(73) Assignee: Adhesives Research, Inc., Glen Rock, PA (US)

( * ) Notice: Subject to any disclaimer, the term of this patent is extended or adjusted under 35 U.S.C. 154(b) by 0 days.

(21) Appl. No.: 09/430,302

(22) Filed: Oct. 29, 1999

(51) Int. Cl.$^7$ .................................................. C09J 7/02
(52) U.S. Cl. ........................ 428/352; 522/170; 522/172; 522/181; 522/182
(58) Field of Search .................. 428/352, 354; 522/170, 172, 181, 182

(56) References Cited

U.S. PATENT DOCUMENTS

| | | |
|---|---|---|
| 3,018,262 A | 1/1962 | Schroeder |
| 3,117,099 A | 1/1964 | Proops et al. |
| 4,058,401 A | 11/1977 | Crivello |
| 4,138,255 A | 2/1979 | Crivello |
| 4,166,150 A * | 8/1979 | Mattor et al. ............... 428/352 |
| 4,231,951 A | 11/1980 | Smith et al. |
| 4,256,828 A | 3/1981 | Smith |
| 4,495,243 A | 1/1985 | Kishi |
| 4,576,999 A | 3/1986 | Eckberg |
| 4,994,299 A | 2/1991 | Stein et al. |
| 5,010,118 A | 4/1991 | Desorcie et al. |
| 5,082,686 A | 1/1992 | Desorcie et al. |
| 5,658,965 A | 8/1997 | Manzouji et al. |

FOREIGN PATENT DOCUMENTS

EP  0522788 A1 * 1/1993 .............. C09J/7/02

* cited by examiner

*Primary Examiner*—Daniel Zirker
(74) *Attorney, Agent, or Firm*—Birch, Stewart, Kolasch & Birch, LLP

(57) ABSTRACT

A pressure sensitive adhesive tape is provided having a silicone-free release layer, said tape comprising (1) at least one backing layer; (2) at least one pressure sensitive adhesive layer, and (3) at least one silicone-free release layer, said release layer comprising a crosslinked poly(alkylene oxide), said poly(alkylene oxide) being defined by the formula $X_1$—$(O$—$R)_n$—$OX_2$ where $X_1$ and $X_2$ are terminal groups at least one of which permits crosslinking of said poly(alkylene oxide), n ranges from 1 to 200,000, R is a straight or branched alkylene group having the formula $(CR_1R_2)_m$ where m is an integer from 1 to 10 and $R_1$ and $R_2$ may independently be hydrogen and $C_{1-3}$ alkyl.

16 Claims, No Drawings

PRESSURE SENSITIVE ADHESIVE TAPE AND SILICONE-FREE RELEASE COATING USED THEREIN

BACKGROUND OF THE PRESENT INVENTION

The present invention is directed to a pressure sensitive adhesive tape and a novel silicone-free release coating used therewith.

Release coatings are used to control or diminish the adhesion between an adhesive and a backing or substrate to which the adhesive is applied. Release coatings may be employed in conjunction with release films, release liners, non-stick carrier webs, and coatings for paper and polymer substrates. A release coating may also comprise a component of a multi-layer or laminated construction. For example, a typical multi-layer or laminated construction may comprise a pressure sensitive adhesive attached to a foamed or non-foamed sheet or film, with one or more release layers being employed on one or more of the backing or adhesive layers. The release layer in such a construction may serve as a protective layer during handling or storage, especially when the adhesive layer is wound upon itself such as in the form of an adhesive tape.

Adhesives find wide applicability in the electronics industry. Commonly, silicone-based, release coatings are employed in conjunction with such adhesives. See, for example, U.S. Pat. Nos. 4,576,999; 4,994,299; 5,010,118; 5,082,686; and 5,658,965. However, it has been found that a small fraction of silicone compounds in the release coating frequently migrate to the adjacent adhesive layer. Silicone contamination has been linked to premature failure of electronic devices. This is a significant disadvantage when such adhesives are used in the production of sensitive electronic or computer devices. Also, the silicone dust produced during the normal handling of the liners in the clean room is unacceptable. It has been proposed to use fluorine-based release coatings as a substitute for silicone-based release coatings to reduce such contamination. However, fluorine-based release coatings are significantly more expensive than the silicone-based release coatings and their use is frequently limited to very specialized applications such as those requiring high temperature tolerance. The fluorine-based release liners also exhibit a static cling resulting in handling problems and the possibility of static discharge in electronic components.

OBJECTS AND SUMMARY OF THE PRESENT INVENTION

It is therefore an object of the present invention to provide a silicone-free release coating for use in a release film.

It is also an object of the present invention to provide a silicone-free release coating for use in conjunction with pressure sensitive adhesives.

It is also an object of the present invention to provide an improved pressure senstive adhesive tape which includes a silicone-free release coating.

In accordance with the present invention, there is thus provided a release film comprising:

(1) a backing layer; and
(2) at least one silicone-free release layer, said release layer comprising a crosslinked poly(alkylene oxide), said poly(alkylene oxide) being defined by the formula $X_1$—$(O$—$R)_n$—$OX_2$ where $X_1$ and $X_2$ are terminal groups at least one of which permits crosslinking of said poly(alkylene oxide) between said $X_1$ and $X_2$ groups and/or with a crosslinking agent, n ranges from 1 to 200,000, R is a straight or branched alkylene group having the formula $(CR_1R_2)_m$ where m is an integer from 1 to 10 and $R_1$ and $R_2$ may independently be hydrogen and $C_{1-3}$ alkyl.

In accordance with another embodiment of the present invention, there is provided a pressure sensitive adhesive tape comprising:

(1) at least one backing layer;
(2) at least one pressure sensitive adhesive layer; and
(3) at least one silicone-free release layer, said release layer comprising a crosslinked poly(alkylene oxide), said poly(alkylene oxide) being defined by the formula $X_1$—$(O$—$R)_n$—$OX_2$ where $X_1$ and $X_2$ are terminal groups at least one of which permits crosslinking of said poly(alkylene oxide) between said $X_1$ and $X_2$ groups and/or with a crosslinking agent, n ranges from 1 to 200,000, R is a straight or branched alkylene group having the formula $(CR_1R_2)_m$ where m is an integer from 1 to 10 and $R_1$ and $R_2$ may independently be hydrogen and $C_{1-3}$ alkyl.

DETAILED DESCRIPTION OF THE INVENTION

The novel release coating of the present invention is comprised of a crosslinked silicone-free poly(alkylene oxide). The poly(alkylene oxide) is defined by the formula $X_1$—$(O$—$R)_n$—$OX_2$ where $X_1$ and $X_2$ are terminal groups at least one of which permits crosslinking of said poly (alkylene oxide) between said $X_1$ and $X_2$ groups and/or with a crosslinking agent, n ranges from 1 to 200,000, R is a straight or branched alkylene group having the formula $(CR_1R_2)_m$ where m is an integer from 1 to 10 and $R_1$ and $R_2$ may independently be hydrogen and $C_{1-3}$ alkyl.

By way of example, the alkylene group R may be selected from the group consisting of —$CH_2CH_2$—, $CH(CH_3)$—$CH_2$, —$CH(CH_2CH_3)CH_2$—, —$CH_2CH_2CH_2CH_2$—, —$CH(CH_3)CH(CH_3)$—, —$C(CH_3CH_3)CH(CH_3)$—, and —$CH_2C(CH_3)_2$—.

The poly (alkylene oxide) can be crosslinked by mean of groups $X_1$ and $X_2$ reacting by condensation, addition or ring opening reactions. These are called self-crosslinking systems. If required, an external crosslinking agent capable of reacting with $X_1$ and $X_2$ may be added.

The requisite crosslinking reaction can occur by means of condensation (either thermal or photoinitiated), cationic (either thermal or photoinitiated) reaction and/or free radical (either thermal or photo initiated) reaction.

The choice of $X_1$ and $X_2$ permits the requisite crosslinking to occur. For instance, isocyanate terminal groups will crosslink with hydroxyl and amine groups. Acid terminal groups will crosslink with hydroxyl, epoxy and amine groups. Epoxy terminal groups will crosslink with hydroxyl groups. By way of example, a hydroxyl-terminated poly (alkylene oxide) will crosslink with an epoxy compound.

Exemplary $X_1$ and $X_2$ terminal groups for use with a self-crosslinking poly (alkylene oxide) include acrylate, methacrylate, epoxy, vinyl ether, propenyl ether and alkoxy silane.

Self-crosslinking poly (alkylene oxides) generally have, on average, at least one polymerizable functional group per molecule and preferably 2–4 groups per molecule. Epoxy, vinyl ether and propenyl ether terminated poly (alkylene oxides) can be crosslinked in the presence of cationic photoinitiators and radiation. One skilled in the art can readily determine suitable radiation/photoinitiator conditions. Acrylate and methacrylate terminated poly (alkylene oxide) can be crosslinked in the presence of free radical initiators. Depending upon the initiator, either thermal or radiation curing may be used to initiate the reaction. Alkoxy silane terminated poly (alkylene oxides) can be crosslinked by thermal means in the presence of a suitable catalyst.

Crosslinking can also occur between the poly (alkylene oxide) and a crosslinking agent each having functionally compatible terminal groups. Exemplary $X_1$ and $X_2$ terminal groups for use in connection with reaction with a crosslinking agent include epoxy, hydroxyl, amine, acid and isocyanate groups. Complementary functional terminal groups on the crosslinking agent include alcohol, acid, epoxy, isocyanate and amine funtionalities. Exemplary crosslinking agents may be di- or multi functional.

The identity of the crosslinking compound is not critical to practice of the claimed invention, as a variety of crosslinking compounds may be employed.

The crosslinking compound may be defined by the formula

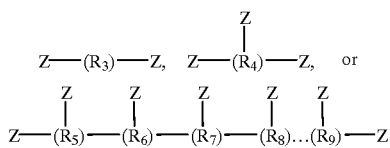

wherein Z is a functional group such as an alcohol, acid, epoxy, isocyanate or amine capable of reacting with terminal groups $X_1$ and $X_2$ on the poly (alkylene oxide), and $R_3$, $R_4$, $R_5$, $R_6$, $R_7$, $R_8$ and $R_9$ are spacer groups the identity of which is not critical. For instance, the spacer groups may be alkylene groups defined by the formula $(CR_{10}R_{11})_p$ where $R_{10}$ and $R_{11}$ may be independently hydrogen and $C_{1-3}$ alkyl and p is an integer from 1 to 10.

Crosslinking compounds useful in the present invention include organic compounds having an oxirane ring, a hydroxyl group, an acid group, an isocyanate group, or an amine group as functional groups polymerizably by ring opening or condensation. For example, compounds having an oxirane ring may be defined by the formula:

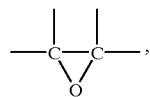

Oxirane ring materials include monomeric epoxy compounds and epoxides of the polymeric type and can be aliphatic, cycloaliphatic, aromatic or heterocyclic, as well as mixtures thereof These materials generally have, on average, at least 1 polymerizable epoxy group per molecule, and preferably at least about 1.5 polymerizable epoxy groups per molecule. The polymeric epoxides include linear polymers having terminal epoxy groups (e.g., a digycidyl ether of a polyoxyalklene glycol), polymers having skeletal oxirane units (e.g., polybutadiene polyepoxide), and polymers having pendent epoxy groups (e.g., a glycidyl methacrylate polymer or copolymer).

Exemplary epoxy-containing materials include but are not limited to those which contain cyclohexene oxide groups such as the epoxycyclohexanecarboxylates, such as 3,4-epoxycyclohexylmethyl-3,4-epoxycyclohexanecarboxylate, 3,4-epoxy-2-methylcyclohexylmethyl-3,4-epoxy-2-methylcyclohexane carboxylate, bis(3,4-epoxycyclohexyl) adipate and bis(3,4-epoxy-6-methycyclohexylmethyl) adipate.

Epoxy-containing materials which are particularly useful in the practice of this invention include glycidyl ether monomers of the formula

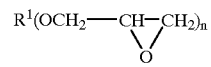

where R' is alkyl or aryl and n is an integer of 1 to 6. Examples are glycidyl ethers of polyhydric phenols obtained by reacting a polyhydric phenol with an excess of chlorochydrin such as epichlorohydrin (e.g., the digycidyl ether of 2,2-bis-(2,3-epoxypropoxyhenol)-propane). One skilled in the art can readily determine the identity of suitable epoxy compounds for use in the present invention. Reference is also made to the disclosure of U.S. Pat. Nos. 3,117,099 and 3,018,262, herein incorporated by reference. Other crosslinking compounds comprise organic compounds having isocyanate (NCO) groups polymerizable by condensation reaction and initiated by thermal means.

The molar ratio of crosslinking compound to poly (alkylene oxide) in the release layer ranges from about 0.5:1 to about 150:1, and preferably from about 1:1 to about 4:1.

In a preferred embodiment, an epoxy crosslinking compound is reacted with a poly (alkylene glycol) to form a low surface energy release coating. In such an embodiment, the molar ratio of epoxy to poly (alkylene glycol) preferably ranges from 0.8:1 to 3:1.

The reaction mixture is exposed to the radiation source for a period of time sufficient to result in crosslinking of the poly(alkylene oxide) itself (or with any crosslinking compound that may be present) whereby a release layer is formed. Exposure to the radiation source will generally range from about 1 second to 10 minutes, depending upon the type of the reactants and the photoinitiator employed, the distance of the radiation source from the reactants, the thickness of the coating to be cured, etc. The release coating may be formed simply by forming a mixture of the poly (alkylene oxide) and crosslinking compound in association with the photoinitiator, coating the mixture onto a backing material, and exposing the coating to a radiation source for a time sufficient to form a cohesive release coating.

In the present invention the term "radiation" means light rays, such as ultraviolet rays, or ionizing radiation such as an electron beam. Thermally initiated reactions in the presence of a suitable catalyst can also be performed. Preferably, ultraviolet lamps are used which emit UV light in the wavelength range absorbed by the particular photoinitiator used. These include medium pressure mercury lamps and low intensity fluorescent lamps, each having various emission spectra and emission maxima between 240 and 400 nanometers. Commercially available microwave powered lamps available from Fusion UV Systems may be utilized.

If the composition is to be cured by exposure to nonionizing radiation, such as ultraviolet radiation, then a photoinitiator is also present in the composition. The photoinitiator, if present, is employed at a concentration of from about 0.1 to 10 weight percent, preferably form 0.5 to 5 weight percent based on the weight of the crosslinking compound.

The photoinitiators which may be used are well known to those skilled in the art. Such photoinitiators include but are not limited to onium salt photoinitiators of the formula Ar+MF6−wherein Ar is a mixed aryl sulfonium or mixed aryl iodonium and M is phosphorus, arsenic or antimony. Exemplary photoinitiators include triarylsulfonium complex salts U.S. Pat. No. 4,231,951); aromatic sulfonium or iodonium salts of halogen-containing complex ions (U.S. Pat. No. 4,256,828); aromatic onium salts of Group IVA elements (U.S. Pat. Nos. 4,058,401 and 4,138,255).

Various modifying substances may be formulated into the poly (alkylene oxide) composition. Such optional modifying substances include but are not limited to silicone release resins, fluorinated ethers and non-ionic surfactants of the formula HO—($CH_2CH_2O$—)$_n$ RH where R is ($CH_2$)$_m$ where n ranges from 1 to 20 and m ranges from 1 to 30. The addition of such compounds serve to enhance the low energy character of the release film. Such compounds can be employed in an amount in the range of from 0.001 to 30% by weight.

The invention is further described in the following examples, which are intended to be merely exemplary of the invention and not limiting in scope.

EXAMPLES

Release coatings were prepared in accordance with the present invention by admixing the various reactants from the following exemplified reaction mixtures and coating the mixture on a 2 mil thick polyester film. The respective coatings were then cured by passing under a 300–600 W/in UV lamp for a period sufficient to yield a cohesive release film.

| Mixture | Poly(alkylene oxide) Reactant | Epoxy Crosslinking Agent |
|---|---|---|
| A | Poly(propyleneglycol) 2000 (2000 g, 1.0 mole) | 3,4-epoxycyclohexylmethyl-3',4'-epoxycyclohexylcarboxylate (428.4 g, 1.7 moles) |
| B | Poly(ethyleneglycol) 1000 (1000 g, 1.0 mole) | 3,4-epoxycyclohexylmethyl-3',4'-epoxycyclohexylcarboxylate (630 g, 2.5 moles) |
| C | Polytetrahydrofuran (2000 g, 1.0 mole) | Limone dioxide (504 g, 3 moles) |
| D | Poly(propyleneglycol) 4000 (4000 g, 1.0 mole) | Bis(3,4-epoxycyclohexylmethyl) adipate (1098 g, 3.0 moles) |
| E | Poly(propyleneglycol glyceryl ether) (6000 g, 1.0 mole) | Bis(3,4-epoxycyclohexylmethyl) adipate (1098 g, 3.0 moles) |

Note: The following initiators were used in the above mixtures:

Mixtures A, B, D and E: Diaryliodonium Hexafluoroantimonate (4.3 g, 6.3 g, 11 g and 11 g, respectively)
Mixture C: Triarylsulfonium Hexafluoroantimonate (5 g)

Several self-crosslinking poly (alkylene oxides) are prepared as follows. Dimethoxysilyl—capped poly (propylene glycol) (100 grams) (available from Kaneka America as KANEKA MS Polymer and KANEKA SILYL) was admixed with a tin catalyst (2 grams). The mixture was coated on a suitable substrate and heated at 250° F. for 2 minutes to form a cured release coating. By way of further example, an acrylate-terminated poly (alkylene glycol) (100 grains) was admixed with a free radical photoinitiator (0.5 wt. percent). The mixture is coated on a suitable substrate and irradiated under UV irradiation to form a cured release coating.

The release liner of the present invention can be employed in conjunction with a pressure sensitive adhesive in the form of an adhesive tape. The identity of the pressure sensitive adhesive which is employed is not critical to practice of the present invention and any pressure sensitive adhesive can be employed in the tape of the present invention. By way of example, suitable pressure sensitive adhesives include but are not limited to adhesives based on polyacrylates, polyvinyl ether, diene rubbers, butyl rubber, butadiene-acrylonitrile polymers, styrene-isoprene block copolymers, ethylene-propylene-diene polymers, styrene-butadiene polymers, poly-alpha-olefins, ethylene vinyl acetate, polyurethanes, polyamides, epoxy compounds, polyvinylpyrrolidone, polyesters, etc. One skilled in the art can readily determine the identity of an acceptable pressure sensitive adhesive.

A variety of backing materials can also be employed without restriction. For example, a variety of polymeric film may be employed as the backing film. Exemplary polymeric films include polyvinyl chloride, vinyl chloride-vinylidene chloride copolymer, vinyl chloride-vinyl acetate copolymer, vinyl chloride-acrylic acid copolymer, polyvinylidene chloride, polyolefins such as polyethylene or polypropylene, polymethyl methacrylate, polyvinyl alcohol, polyamide, polyimide, polyamideimide, polyesters such as polyethylene terephthalate, polycarbonate, polyurethance and cellulose acetate. A variety of non-polymeric films may also be employed with advantage if desired.

The adhesive tape of the present invention may take many forms. The release layer may be formed on one surface of a suitable backing material, with an adhesive layer being formed on the opposing surface of the backing material. The release layer may be formed on both sides of the backing material, with a layer of adhesive being formed on the exposed surface of one of the release layers. Alternatively, the release layer may be applied to a layer of adhesive which is formed on the backing material. Still further, the adhesive layer may be applied to a release layer which is itself applied to the backing layer. Other embodiments may be apparent to those skilled in the art and which fall within the scope of the invention.

The adhesive tape of the present invention may be formed by conventional means. To form the release liner, a reaction mixture of the poly(alkylene oxide) having the requisite functional terminal groups $X_1$ and $X_2$ and crosslinking compound together with initiator is coated on a suitable backing layer and caused to react in the presence of a suitable thermal and/or radiation source. Alternatively, the release liner may be formed by coating a mixture of suitably functionalized self-crosslinkable poly(alkylene glycol) and a suitable initiator on a backing layer and caused to react in the presence of a suitable thermal and/or radiation source. An adhesive tape may be formed by lamination of the thus-formed release liner to a preformed laminate of adhesive on a backing material, whereby the release coating is applied to the adhesive layer. Alternatively, an adhesive layer may be coated onto one or more surfaces of the release liner, with a second release liner optionally subsequently being applied to the adhesive layer to form a tape comprised of an adhesive layer sandwiched between two backing layers and two release layers. Still further, an adhesive layer may be coated onto one surface of a release coating of a laminate comprised of a backing layer sandwiched between two release layers. Additional embodiments may be apparent to those skilled in the art yet still fall within the scope of the present invention.

What is claimed is:

1. A release film comprising:
   (1) a backing layer; and
   (2) at least one silicone-free release layer, said release layer comprising a crosslinked poly(alkylene oxide), said poly(alkylene oxide) being defined by the formula $X_1$—(O—R)$_n$—OX$_2$ where n ranges from 1 to 200,000, R is a straight or branched alkylene group defined by the formula $(CR_1CR_2)_m$ where m is an integer from 1 to 10 and $R_1$ and $R_2$ may independently be hydrogen and $C_{1-3}$ alkyl, and $X_1$ and $X_2$ are terminal groups both of which permit crosslinking of said poly(alkylene oxide) between said $X_1$ and $X_2$ groups and/or with a crosslinking compound.

2. The film of claim 1 wherein at least one of $R_1$ and $R_2$ is $C_{1-3}$ alkyl.

3. The film of claim 1 wherein $R_1$ and $R_2$ are hydrogen.

4. The film of claim 1 wherein R is selected from the group consisting of —CH$_2$CH$_2$—, CH(CH$_3$)—CH$_2$, —CH(CH$_2$CH$_3$)CH$_2$—, —CH$_2$CH$_2$CH$_2$CH$_2$—, —CH(CH$_3$)CH($_3$)—, —C(CH$_3$CH$_3$)CH(CH$_3$)—, and —CH$_2$—C(CH$_3$)$_2$.

5. The film of claim 1 wherein $X_1$ and $X_2$ are selected from the group consisting of epoxy, hydroxyl, amine, hydrogen, acid and isocyanate groups.

6. The film of claim 5 wherein at least one of $X_1$ and $X_2$ is an epoxy group.

7. The film of claim 1 wherein $X_1$ and $X_2$ are selected from the group consisting of acrylate, methacrylate, epoxy, vinyl ether, propenyl ether and alkoxy silane.

8. An adhesive tape comprising:
  (1) at least one backing layer;
  (2) at least one pressure sensitive adhesive layer on said backing layer; and
  (3) at least one silicone-free release layer, said release layer comprising a crosslinked poly(alkylene oxide), said poly(alkylene oxide) being defined by the formula $X_1$—(O—R)$_n$—OX$_2$ where n ranges from 1 to 200,000, R is a straight or branched alkylene group defined by the formula $(CR_1CR_2)_m$ where m is an integer from 1 to 10 and $R_1$ and $R_2$ may independently be hydrogen and $C_{1-3}$ alkyl, and $X_1$ and $X_2$ are terminal groups both of which permit crosslinking of said poly(alkylene oxide) between said $X_1$ and $X_2$ groups and/or with a crosslinking compound.

9. The tape of claim 8 wherein at least one of $R_1$ and $R_2$ is $C_{1-3}$ alkyl.

10. The tape of claim 8 wherein $R_1$ and $R_2$ are hydrogen.

11. The tape of claim 8 wherein R is selected from the group consisting of —CH$_2$CH$_2$—, CH(CH$_3$)—CH$_2$, —CH(CH$_2$CH$_3$)CH$_2$—, —CH$_2$CH$_2$CH$_2$CH$_2$—, —CH(CH$_3$)CH(CH$_3$)—, —C(CH$_3$CH$_3$)CH(CH$_3$)—, and —CH$_2$—C(CH$_3$)$_2$—.

12. The tape of claim 8 wherein $X_1$ and $X_2$ are selected from the group consisting of epoxy, ydroxyl, amine, hydrogen, acid and isocyanate groups.

13. The tape of claim 12 wherein at least one of $X_1$ and $X_2$ is an epoxy group.

14. The tape of claim 8 wherein $X_1$ and $X_2$ are selected from the group consisting of acrylate, methacrylate, epoxy, vinyl ether, propenyl ether and alkoxy silane.

15. The tape of claim 8 wherein said release layer is adjacent said backing layer.

16. The tape of claim 8 wherein said release layer is adjacent said adhesive layer.

* * * * *